Oct. 17, 1961 R. J. ROBBINS 3,005,089
INDICATING DEVICE FOR A VEHICLE
Filed April 24, 1959
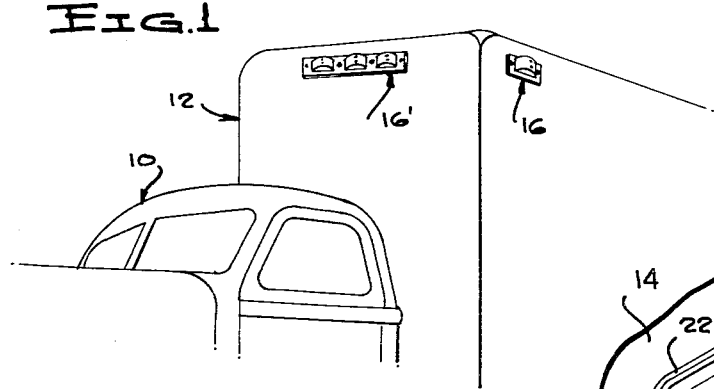
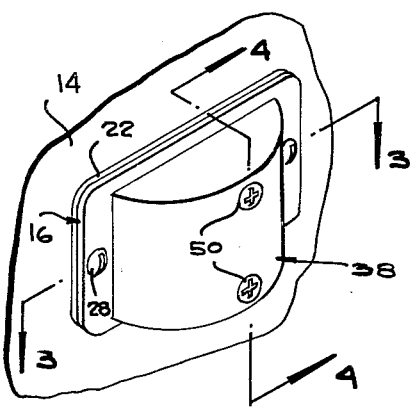
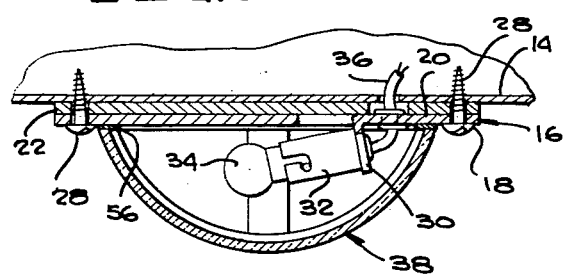
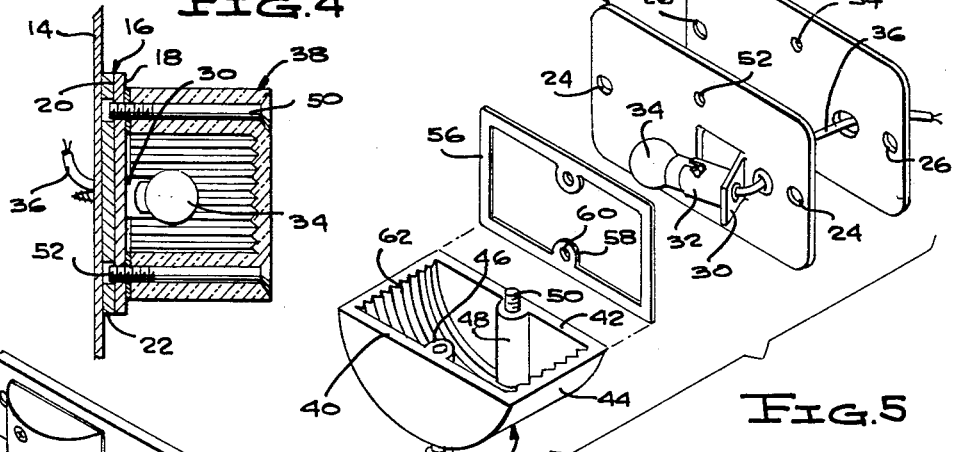
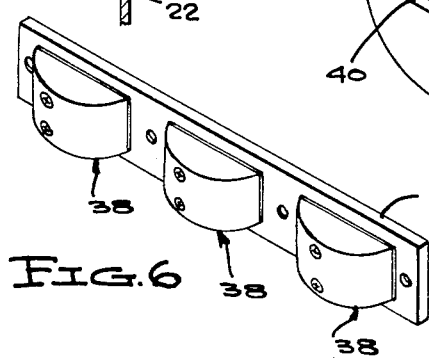
INVENTOR.
ROBERT J. ROBBINS
BY
*McMorrow, Berman & Davidson*
ATTORNEYS

United States Patent Office 3,005,089
Patented Oct. 17, 1961

3,005,089
INDICATING DEVICE FOR A VEHICLE
Robert J. Robbins, 401 N. Michigan Ave.,
Greensburg, Ind.
Filed Apr. 24, 1959, Ser. No. 808,646
5 Claims. (Cl. 240—7.1)

The present invention relates to a device for indicating the marginal edges of a vehicle.

Presently in use on trucks and trailers are lights for indicating the extreme marginal edges of the truck or trailer. These lights are generally applied at the front or rear ends, and at the sides of the truck or trailer, to clearly indicate the width and length of the vehicle body. Such indicating lights facilitate the operation of the truck or trailer into and out of parking spaces, and also serve to illuminate the vehicle body so as to prevent collision with the body of other vehicles in motion. A requirement for such a light is that it protrude as little as possible beyond the marginal edge of the truck or trailer in which it is installed in order that it not be an obstruction on the vehicle body easily broken when the body is in a limited space. Another requirement for such a light is that it be visible, when illuminated, from all directions.

An object of the present invention is to provide an indicating light for a vehicle body which lends itself to clear visibility from all directions when illuminated.

Another object of the present invention is to provide an indicating light for the marginal edge of a vehicle body which, when installed on a vehicle body, protrudes only slightly outwardly from the vehicle body and one which is not readily dislodged from the vehicle body when installed thereon.

A further object of the present invention is to provide an indicating device or light for installation on a vehicle body which is shaped so as to deflect therefrom any objects against which the vehicle body may scrape.

A still further object of the present invention is to provide an indicating light or device for installation on a vehicle body which is simple in structure, one having relatively high resistance to impact, one having long-life characteristics, one which is readily attached to and detached from a vehicle body, and one which is economically feasible.

These and other objects and advantages of the present invention will be fully apparent from the following description when taken in conjunction with the annexed drawing, in which:

FIGURE 1 is an isometric view of a portion of a truck or tractor cab and forward portion of a trailer body or truck body, showing the device of the present invention installed thereon as a single unit on the side of the body and has a triple unit on the front of the body;

FIGURE 2 is an isometric view of the device of the present invention shown installed upon a vehicle body, only a portion of the body being shown;

FIGURE 3 is a view on an enlarged scale, taken on the line 3—3 of FIGURE 2;

FIGURE 4 is a view on an enlarged scale, taken on the line 4—4 of FIGURE 2;

FIGURE 5 is an isometric exploded view of the assembly shown in FIGURE 2; and

FIGURE 6 is an isometric view showing three of the devices of the present invention installed as a unit on a single mounting member.

Referring in greater detail to the drawing in which like numerals indicate like parts throughout the several views, in FIGURE 1 the reference numeral 10 designates the cab of a truck or tractor and the numeral 12 by the body of a trailer or truck. In FIGURES 2, 3, and 4, the numeral 14 designates the wall of such a truck or trailer body.

The device of the present invention is adapted for installation upon the wall 14 and it comprises a flat mounting plate or member 16 having a front face 18 and a back face 20. A resilient plate 22, shown somewhat exaggerated in thickness in FIGURES 3 and 4, is interposed between the back face 20 of the member 16 and the wall 14 and serves to cushion the light of the present invention against shocks transmitted through the wall 14. For all purposes, the mounting plate or member 16 is understood to be mounted in abutting face to face relation with respect to the wall 14 with the back face 20 overlying the front face of the plate 22.

Means, embodying holes 24 and 26, are provided on the member 16 and plate 22, respectively, inwardly of each end thereof for receiving screws or other fastening elements when the member 16 is positioned in abutting face to face relation with respect to the wall 14 for securing the member 16 to the wall 14, the screws being shown in FIGURE 3 and designated by the reference numeral 28.

The mounting plate or member 16 is provided with a cutout portion 30 bent forward to form a bracket, as shown most clearly in FIGURE 5. The bracket portion 30 projects forwardly from the front face of the member 16 and carries a lamp socket 32 which is arranged at an acute angle with respect to the front face 18 of the member 16. The socket 32 is forwardly of and spaced from the face 18 of the member 16.

A lamp bulb 34 is removably positioned within the socket 32. The socket 32 constitutes one grounded connection for the bulb 34 and a wire 36 extends through the bracket portion 30 of the member 16 and is in electrical engagement with the base contact (not shown) of the bulb 34 and is adapted to be connected to a source of current within the trailer or truck body 12. This source of current is generally the storage battery of the truck or trailer.

A transparent cover in the form of a semicylindrical hollow housing 38 is positioned so that it wholly encloses the socket 32 and bulb 34. The housing 38 includes a pair of half section discs 40 and 42 and a convexly curved wall 44 interposed between the discs 40 and 42 with the marginal edges of the wall 44 secured to the discs 40 and 42.

At least two barrels 46 and 48 extend transversely from the midpoint of the wall 44 through an opening out of the open side of the discs 40 and 42. The openings through the barrels 46 and 48 extend from the exterior of the wall 44 to the flat open side of the housing 38.

Fastening elements, in the form of bolts 50, extend through the holes in the barrels 46 and 48 and detachably secure the housing 38 to the mounting plate or member 16. The mounting plate or member 16 is provided with a tapped hole 52 receiving the adjacent portion of the respective bolt 50. The plate 22 is provided with an opening 54 in registry with each hole 52 for receiving the free end portion of each bolt 50 when the housing 38 is in assembled position fully enclosing the bulb 34 and socket 32. The bolts 50 extend transversely through the housing 38 and detachably secure the housing 38 to the mounting plate or member 16 with a gasket (FIGURE 5) interposed between the flat side of the housing 38 and the front face 18 of the member 16, the gasket being designated by the numeral 56.

Tabs 58 are provided on the inner periphery of the gasket 56 and each has a hole 60 for receiving the bolt 50 when the bolts are in position holding the housing 38 on the mounting member 16.

An important feature of the invention is the provision of the barrels 46 and 48 on the inner faces of the half section discs 40 and 42, respectively. The barrels 46 and 48 strengthen the housing 38 and provide rigidity to the discs 40 and 42. The inner face of the wall 44 is provided with ridges 62 to better distribute the light from the bulb 34.

In FIGURE 6, three housing 38 are shown secured to a single mounting plate or member 16'. This permits the mounting of more than one unit for purposes of identification, as shown in FIGURE 1 on the forward panel of the truck or trailer body 12. When so used, the bulbs 34 within the three housings 38 may be selectively energized in any combination so as to provide a prearranged signal for other truck or trailer operators.

In use, the mounting plate or member 16 is quickly and easily secured to the wall 14 of a truck or trailer body 12 at any desired point thereon. After the bulb 34 has been inserted into the socket 32, in the conventional manner, the housing 38 is quickly and easily secured to the plate or member 16 by means of the bolts 50. The shape of the housing 38 is such that ordinary objects when brushing against the side of the body 12 will be deflected by the shape of the housing 38 and no damage will ordinarily result to the light or bulb 34.

Preferably, the housing 38 is fabricated wholly of a plastic material formed by molding in conventional molding machines and of such thickness as to have high strength characteristics and in such color as desired.

What is claimed is:

1. The combination with a vehicle body having a wall, of an indicating device comprising a resilient plate positioned so that it is in abutting face-to-face relation with respect to said wall, a mounting member having a front face and a back face positioned so that the back face is in abutting face-to-face relation with respect to said plate, means on said member and said plate for receiving fastening elements, fastening elements extending through the means on said member and plate for securing the member and the plate to said wall, a lamp socket on the front face of said member, a lamp bulb in said socket, and a transparent cover in the form of a hollow housing and shaped to wholly enclose said socket and bulb positioned so that it wholly encloses said socket and bulb with the open side adjacent to the front face of said member, and fastening elements extending transversely through said housing and detachably secured to the adjacent portions of said mounting member.

2. The combination with a vehicle body having a wall, of an indicating device comprising a resilient plate positioned so that it is in abutting face-to-face relation with respect to said wall, a mounting member having a front face and a back face positioned so that the back face is in abutting face-to-face relation with respect to said plate, means on said member and said plate for receiving fastening elements, fastening elements extending through the means on said member and said plate for securing the member and the plate to said wall, a lamp socket on the front face of said member, a lamp bulb in said socket, and a transparent cover in the form of a hollow housing and shaped to wholly enclose said socket and bulb positioned so that it wholly encloses said socket and bulb with the open side adjacent to the front face of said member, a gasket interposed between the open side of said housing and the front face of said member and surrounding said socket and bulb, and fastening elements extending transversely through said housing and gasket and detachably secured to the adjacent portions of said mounting member.

3. The combination with a vehicle body having a wall, of an indicating device comprising a resilient plate positioned so that it is in abutting face-to-face relation with respect to said wall, a mounting member having a front face and a back face positioned so that the back face is in abutting face-to-face relation with respect to said plate, means on said member and said plate for receiving fastening elements, fastening elements extending through the means on said member and said plate for securing the member and the plate to said wall, a lamp socket on the front face of said member, a lamp bulb in said socket, a transparent cover in the form of a semicylindrical hollow housing including a pair of half section discs and a convexly curved wall interposed between said discs and having the marginal edges secured to said discs, at least two barrels extending transversely from the midpoint of said wall to and opening out of the open side of said housing, said housing being positioned so that it wholly encloses said socket and bulb with the flat side adjacent to the front face of said member, and fastening elements extending through said barrels and detachably secured to the adjacent portions of said mounting member.

4. The combination with a vehicle body having a wall, of an indicating device comprising a resilient plate positioned so that it is in abutting face-to-face relation with respect to said wall, a mounting member having a front face and a back face positioned so that the back face is in abutting face-to-face relation with respect to said plate, means on said member and said plate for receiving fastening elements, fastening elements extending through the means on said member and said plate for securing the member and the plate to said wall, a bracket projecting from the front face of said member, a lamp socket arranged forwardly of and at an acute angle with respect to the front face of said member and carried by said bracket, a lamp bulb in said socket, a transparent cover in the form of a semicylindrical hollow housing including a pair of half section discs and a convexly curved wall interposed between said discs and having the marginal edges secured to said discs, at least two barrels extending transversely from the midpoint of said wall to and opening out of the open side of said housing, said housing being positioned so that it wholly encloses said socket and bulb with the flat side adjacent to the front face of said member, and fastening elements extending through said barrels and detachably secured to the adjacent portions of said mounting member.

5. The combination with a vehicle body having a wall, of an indicating device comprising a resilient plate positioned so that it is in abutting face-to-face relation with respect to said wall, a mounting member having a front face and a back face positioned so that the back face is in abutting face-to-face relation with respect to said plate, means on said member and said plate for receiving fastening elements, fastening elements extending through the means on said member and said plate for securing the member and the plate to said wall, a bracket projecting from the front face of said member, a lamp socket arranged forwardly of and at an acute angle with respect to the front face of said member and carried by said bracket, a lamp bulb in said socket, a transparent cover in the form of a semicylindrical hollow housing including a pair of half section discs and a convexly curved wall interposed between said discs and having the marginal edges secured to said discs, at least two barrels extending transversely from the midpoint of said wall to and opening out of the open side of said housing, said housing being positioned so that it wholly encloses said socket and bulb with the flat side adjacent to the front face of said member, a gasket interposed between the flat side of said housing and the front face of said member and surrounding said socket and bulb, and fastening elements extending transversely through said barrels and gasket and detachably secured to the adjacent portions of said member.

References Cited in the file of this patent

UNITED STATES PATENTS

| | | |
|---|---|---|
| 2,197,038 | Glocksine et al. | Apr. 16, 1940 |
| 2,731,544 | Kayser | Jan. 17, 1956 |
| 2,786,935 | Geary | Mar. 26, 1957 |
| 2,804,539 | Robbins | Aug. 27, 1957 |
| 2,853,595 | Baldwin | Sept. 23, 1958 |
| 2,876,340 | Williams | Mar. 3, 1959 |
| 2,901,593 | McNally | Aug. 25, 1959 |